(12) United States Patent
Backmark et al.

(10) Patent No.: US 11,033,016 B2
(45) Date of Patent: Jun. 15, 2021

(54) ROLL FOR ASSEMBLING A DEVICE FOR DETECTION AND ELIMINATION OF INSECTS SUCH AS BED BUGS

(71) Applicant: Nattaro Labs AB, Lund (SE)

(72) Inventors: Magnus Backmark, Sodra Sandby (SE); Carl-Magnus Hansson, Lund (SE); Christine Dahlman Jacobsen, Lund (SE); Camilla Ryne, Teckomatorp (SE)

(73) Assignee: NATTARO LABS AB

( * ) Notice: Subject to any disclaimer, the term of this patent is extended or adjusted under 35 U.S.C. 154(b) by 558 days.

(21) Appl. No.: 15/860,816

(22) Filed: Jan. 3, 2018

(65) Prior Publication Data
US 2018/0125051 A1 May 10, 2018

Related U.S. Application Data

(62) Division of application No. 14/376,194, filed as application No. PCT/SE2013/050082 on Jan. 31, 2013, now Pat. No. 9,901,088.
(Continued)

(30) Foreign Application Priority Data

Feb. 2, 2012 (SE) .................................. 1250074-0

(51) Int. Cl.
*A01M 1/02* (2006.01)
*A01M 1/14* (2006.01)
(Continued)

(52) U.S. Cl.
CPC .............. *A01M 1/02* (2013.01); *A01M 1/026* (2013.01); *A01M 1/10* (2013.01); *A01M 1/103* (2013.01);
(Continued)

(58) Field of Classification Search
CPC .......... A01M 1/00; A01M 1/02; A01M 1/026; A01M 1/10; A01M 1/103; A01M 1/14; A01M 1/20; A01M 1/2011
(Continued)

(56) References Cited

U.S. PATENT DOCUMENTS 119,905 A * 10/1871 Wier ............................. 43/123
161,032 A * 3/1875 Hawkins ....................... 43/123
(Continued)

FOREIGN PATENT DOCUMENTS

DE 19808745 9/1999
DE 19808745 A1 * 9/1999 .......... A01M 1/2011
(Continued)

OTHER PUBLICATIONS

Translation of KR 10-118103 (Year: 2012).*
(Continued)

*Primary Examiner* — Darren W Ark
(74) *Attorney, Agent, or Firm* — Ware, Fressola, Maguire & Barber LLP (57) ABSTRACT

A roll for assembling a device (2) for detection and elimination of pest insects includes a wound up, continuous band of fibrous material, the band having a main portion (22) and a first flap folded thereover, wherein at least one aperture (35) is arranged in the main portion along at least part of the length of the continuous band, the face facing away from the first flap such that the adhesive strip completely covers over the at least one aperture, the aperture being at least partially filled with an insecticide in powder form. The roll may include a second flap, wherein the first flap and the second flap at least partially overlap and the second flap is sandwiched between the main portion and the first flap.

2 Claims, 5 Drawing Sheets

Related U.S. Application Data (60) Provisional application No. 61/696,841, filed on Sep. 5, 2012.

(51) Int. Cl.
  *A01M 1/10* (2006.01)
  *A01M 1/20* (2006.01)

(52) U.S. Cl.
  CPC ............ *A01M 1/14* (2013.01); *A01M 1/2011* (2013.01); *Y02A 50/30* (2018.01)

(58) Field of Classification Search
  USPC ........................ 43/123, 114, 132.1, 131, 121
  See application file for complete search history.

(56) References Cited

U.S. PATENT DOCUMENTS

| | | | | |
|---|---|---|---|---|
| 246,771 A * | 9/1881 | Hey | ................................ | 43/123 |
| 276,844 A * | 5/1883 | Manahan | ................. | A01M 1/14 |
| | | | | 43/114 |
| 391,930 A * | 10/1888 | Wilson | ............................ | 43/123 |
| 481,270 A * | 8/1892 | Baggesen | ........................ | 43/123 |
| 834,518 A * | 10/1906 | Grasser | ............................ | 43/123 |
| 844,919 A * | 2/1907 | Brundin | ............................ | 43/123 |
| 1,081,363 A * | 12/1913 | Celene | ............................ | 43/123 |
| 1,201,720 A * | 10/1916 | Hagermann | .................... | 43/123 |
| 1,223,016 A * | 4/1917 | Young | ............................ | 43/123 |
| 1,259,911 A * | 3/1918 | Seibert | .................. | A01M 1/103 |
| | | | | 43/131 |
| 1,261,842 A * | 4/1918 | Muller | ............................ | 43/123 |
| 1,357,267 A * | 11/1920 | Young | ..................... | A01M 1/10 |
| | | | | 119/532 |
| 2,062,789 A * | 12/1936 | Keller | .................. | A01G 13/105 |
| | | | | 47/30 |
| 2,143,043 A * | 1/1939 | Wexler | ..................... | A01M 1/18 |
| | | | | 43/108 |
| 2,315,772 A * | 4/1943 | Closs | ....................... | A01M 1/14 |
| | | | | 43/131 |
| 2,808,679 A * | 10/1957 | Collins | .................... | A01M 1/14 |
| | | | | 43/131 |
| 2,911,756 A * | 11/1959 | Geary | ....................... | A01M 1/02 |
| | | | | 43/114 |
| 3,304,646 A * | 2/1967 | Staley | .................... | A01M 1/103 |
| | | | | 43/131 |
| 3,816,956 A * | 6/1974 | Sekula | .................... | A01M 1/14 |
| | | | | 43/114 |
| 3,931,692 A * | 1/1976 | Hermanson | ......... | A01M 1/2055 |
| | | | | 43/131 |
| 4,048,747 A * | 9/1977 | Shanahan | ................ | A01M 1/02 |
| | | | | 43/114 |
| 4,217,722 A * | 8/1980 | McMullen | ............... | A01M 1/14 |
| | | | | 43/114 |
| 4,263,740 A * | 4/1981 | Hemsarth | ................ | A01M 1/02 |
| | | | | 43/114 |
| 4,395,842 A * | 8/1983 | Margulies | ................ | A01M 1/02 |
| | | | | 43/114 |
| 4,425,731 A * | 1/1984 | Orlando | ............. | A01M 23/005 |
| | | | | 229/115 |
| 4,709,504 A * | 12/1987 | Andric | ..................... | A01M 1/14 |
| | | | | 43/114 |
| 4,756,116 A * | 7/1988 | Cutter | .................. | A01G 13/105 |
| | | | | 43/108 |
| 4,800,671 A * | 1/1989 | Olson | ..................... | A01M 1/18 |
| | | | | 43/108 |
| 4,862,638 A * | 9/1989 | Stevenson | ............... | A01M 1/14 |
| | | | | 43/114 |
| 4,876,823 A * | 10/1989 | Brunetti | ................ | A01M 1/14 |
| | | | | 43/114 |
| 5,111,610 A * | 5/1992 | Morisset | ................ | A01M 1/145 |
| | | | | 43/113 |
| 5,119,586 A * | 6/1992 | Townsend | ............... | A01M 1/14 |
| | | | | 43/114 |
| 5,157,866 A * | 10/1992 | Rosie | ..................... | A01M 1/02 |
| | | | | 43/107 |
| 5,233,787 A * | 8/1993 | Andersen | ............. | A01K 13/003 |
| | | | | 119/28.5 |
| 5,454,186 A * | 10/1995 | Gang | ..................... | A01M 1/14 |
| | | | | 43/114 |
| 5,644,998 A * | 7/1997 | Krolick | .............. | A01G 13/0275 |
| | | | | 111/102 |
| 5,771,628 A * | 6/1998 | Nobbs | .................... | A01M 1/14 |
| | | | | 43/121 |
| 5,815,981 A * | 10/1998 | Dowling | ................. | A01M 1/14 |
| | | | | 43/114 |
| 6,594,947 B2 * | 7/2003 | Lingren | .................. | A01M 1/14 |
| | | | | 43/114 |
| 7,676,985 B1 * | 3/2010 | Perkins | ................. | A01M 1/026 |
| | | | | 43/114 |
| 7,748,159 B1 * | 7/2010 | Wenner | ................. | A01M 1/145 |
| | | | | 43/119 |
| 8,215,051 B2 * | 7/2012 | Alexander | ............. | A01G 17/12 |
| | | | | 43/132.1 |
| 8,371,064 B2 * | 2/2013 | Watson | .................... | A01M 1/24 |
| | | | | 43/114 |
| 8,413,370 B2 * | 4/2013 | Messian | ................. | A01M 1/14 |
| | | | | 43/114 |
| 8,789,309 B2 * | 7/2014 | Fabry | ..................... | A01M 1/026 |
| | | | | 43/123 |
| 9,220,254 B2 * | 12/2015 | Dong | ....................... | A47G 9/02 |
| 9,226,488 B2 * | 1/2016 | Schumacher | ........... | A01M 1/14 |
| 9,510,583 B2 * | 12/2016 | Yamauchi | ............. | A01M 1/103 |
| 9,901,088 B2 * | 2/2018 | Backmark | ............... | A01M 1/02 |
| 10,806,136 B2 * | 10/2020 | Pradines | ................. | A01M 1/20 |
| 2004/0216367 A1 * | 11/2004 | Klein | ...................... | A01M 1/14 |
| | | | | 43/114 |
| 2005/0235397 A1 * | 10/2005 | Cosenza | ................. | A01M 1/14 |
| | | | | 2/242 |
| 2006/0021275 A1 * | 2/2006 | Howse | ................. | A01M 1/2011 |
| | | | | 43/131 |
| 2006/0130392 A1 * | 6/2006 | Harrington | ........... | A01M 29/34 |
| | | | | 43/132.1 |
| 2006/0201054 A1 * | 9/2006 | Katsuura | ................. | A01M 1/20 |
| | | | | 43/129 |
| 2007/0044372 A1 * | 3/2007 | Lang | ..................... | A01M 1/023 |
| | | | | 43/114 |
| 2007/0193109 A1 * | 8/2007 | Chyun | ................... | A01M 1/026 |
| | | | | 43/114 |
| 2009/0223115 A1 * | 9/2009 | Lang | ....................... | A01M 1/14 |
| | | | | 43/114 |
| 2010/0011655 A1 * | 1/2010 | Frisch | ..................... | A01M 1/14 |
| | | | | 43/114 |
| 2010/0043274 A1 * | 2/2010 | Battick | .................... | A01M 1/14 |
| | | | | 43/114 |
| 2010/0043275 A1 * | 2/2010 | Battick | .................... | A01M 1/20 |
| | | | | 43/114 |
| 2010/0212213 A1 * | 8/2010 | Hope, III | ............... | A01M 1/026 |
| | | | | 43/123 |
| 2012/0012046 A1 * | 1/2012 | Cain | ...................... | A01M 1/026 |
| | | | | 116/200 |
| 2012/0144729 A1 * | 6/2012 | de Lame | ............. | A01M 1/2011 |
| | | | | 43/131 |
| 2012/0167309 A1 * | 7/2012 | Heidorn | ............... | A47G 9/0246 |
| | | | | 5/691 |
| 2012/0210628 A1 * | 8/2012 | Park | ........................ | A01M 1/14 |
| | | | | 43/114 |
| 2012/0291336 A1 * | 11/2012 | Friend | ..................... | A01M 1/14 |
| | | | | 43/114 |
| 2012/0291337 A1 * | 11/2012 | Curcio | .................. | A01M 1/023 |
| | | | | 43/114 |
| 2013/0031825 A1 * | 2/2013 | Dass | ....................... | A01M 1/14 |
| | | | | 43/114 |
| 2013/0145679 A1 * | 6/2013 | Nenninger | ............. | A01K 51/00 |
| | | | | 43/114 |
| 2013/0145680 A1 * | 6/2013 | Soltis | ................... | A01M 1/023 |
| | | | | 43/114 |
| 2014/0084774 A1 * | 3/2014 | Phillips | ................. | A01M 1/2011 |
| | | | | 312/352 |

(56) References Cited

U.S. PATENT DOCUMENTS

| | | | | |
|---|---|---|---|---|
| 2015/0007485 A1* | 1/2015 | Hortel | ............... | A01M 1/026 43/114 |
| 2015/0223442 A1 | 8/2015 | Yamauchi et al. | | |
| 2015/0237842 A1* | 8/2015 | Thuis | ............... | A01M 1/103 43/114 |
| 2015/0289495 A1* | 10/2015 | Olszak | ............... | A01M 1/2011 43/132.1 |
| 2016/0000059 A1* | 1/2016 | Kondo | ............... | A01M 1/103 43/121 |
| 2017/0265450 A1* | 9/2017 | Priddy | ............... | A01M 1/14 |
| 2018/0014524 A1* | 1/2018 | Peterson | ............... | A01M 1/106 |
| 2018/0027794 A1* | 2/2018 | Hortel | ............... | A01M 1/14 |
| 2020/0107535 A1* | 4/2020 | Hutter | ............... | A01M 1/14 |

FOREIGN PATENT DOCUMENTS

| | | | | | |
|---|---|---|---|---|---|
| DE | 10210450 A1 | | 9/2003 | | |
| GB | 2443701 | | 5/2008 | | |
| GB | 2443701 A | * | 5/2008 | ............ | A01M 1/103 |
| GB | 2463953 | | 4/2010 | | |
| GB | 2463953 A | * | 4/2010 | ............ | A01M 1/103 |
| JP | 10052205 | | 2/1998 | | |
| JP | 10052205 A | * | 2/1998 | | |
| JP | 10052206 | | 2/1998 | | |
| JP | 10052206 A | * | 2/1998 | | |
| JP | 2001120147 | | 5/2001 | | |
| JP | 2001120147 A | * | 5/2001 | | |
| JP | 2001354503 | | 12/2001 | | |
| JP | 2001354503 A | * | 12/2001 | | |
| JP | 2004215577 | | 8/2004 | | |
| JP | 2004215577 A | * | 8/2004 | | |
| JP | 200667810 | | 3/2006 | | |
| JP | 2006067810 A | * | 3/2006 | | |
| JP | 2008187995 A | * | 8/2008 | | |
| JP | 2008271932 A | * | 11/2008 | | |
| JP | 2013252102 | | 12/2013 | | |
| JP | 2013252102 A | * | 12/2013 | | |
| JP | 2014064499 | | 4/2014 | | |
| JP | 2014064499 A | * | 4/2014 | | |
| KR | 20110051936 A | * | 5/2011 | | |
| KR | 20110113350 A | * | 10/2011 | | |
| KR | 20120003758 U | * | 5/2012 | | |
| KR | 101167255 B1 | * | 7/2012 | | |
| KR | 101183103 B1 | * | 9/2012 | | |
| WO | WO99/60848 A1 | | 12/1999 | | |
| WO | WO-2020087055 A1 | * | 4/2020 | ............ | A01M 1/02 |

OTHER PUBLICATIONS

Translation of KR 10-2011-0051936 (Year: 2011).*
International Search Report for PCT/SE2013/050082, dated Apr. 19, 2013, 4 pages.

* cited by examiner

ROLL FOR ASSEMBLING A DEVICE FOR DETECTION AND ELIMINATION OF INSECTS SUCH AS BED BUGS

CROSS REFERENCE TO RELATED APPLICATIONS

This application is a divisional application claiming priority to pending U.S. patent application Ser. No. 14/376,194 filed Aug. 1, 2014 which is a national stage of PCT International application no. PCT/SE2013/050082, filed 31 Jan. 2013, which claimed priority in Swedish patent application no. 1250074-0, filed 2 Feb. 2012 and in U.S. Provisional patent application No. 61/696,841 filed 5 Sep. 2012, the contents of these applications being hereby incorporated by reference herein.

TECHNICAL FIELD

The disclosure relates to a device for detection and elimination of insects such as bed bugs.

BACKGROUND

Insect infestation of human habitats has been on the increase in recent years. One reason for this increase is the development of resistant insect species that are virtually immune to prevalent extermination methods. By way of example, the population of bed bugs, having been almost eradicated in the developed world in the 1940s, has slowly been recovering since then. Moreover, the recovery has accelerated since mid-1990s.

Bed bugs are also representative for synoptically illustrating behaviour and properties of the entire class of crawling insects. Accordingly, bed bugs are wingless insects with exoskeleton, the size and shape of the apple seed. They favour tight and dark spaces. Consequently, they prefer to hide in crevices and cracks in floor/walls and behind skirting-boards. They feed on blood, are active at night and bite any areas of exposed skin. A number of adverse health effects may occur due to bed bug bites, including skin rashes, allergic reactions and/or mental distress. Obviously, above-mentioned rise in population has contributed to increase in bed bug bites and related conditions.

Several methods of combating infestation in general, and that of bed bugs in particular, are known in the art.

One way to address said problem is to subject, for a determined period of time, the infested area to a temperature, either high or low, that is injurious to bed bugs. Accordingly, to kill adult bedbugs as well as laid eggs, said area needs to be heated above 45° C. for one hour or be kept below −18° C. for at least 48 hours.

One frequently used method for combating bed bugs is to spread diatomaceous earth (DE) in powder form on the floor and/or along or behind skirting-boards of the room. Once the bed bug comes into contact with DE, substantially needle-shaped, micrometer-sized pieces of DE penetrate the exoskeleton of the bed bug. This starts an irreversible dehydrating process in the bed bug eventually leading to its death. This method may be used in combating other insects having similar properties and behavioural patterns.

The above method is, however, ridden with considerable drawbacks. More specifically, spreading DE in powder form creates a hazardous working environment for the sanitation personnel and the inhabitants since prolonged exposure to air borne dust released by freely laid DE-powder increases risk of silicosis. Said release of dust is accelerated by movement of air in the room. To avoid damage to their respiratory organs, sanitation personnel wear protective equipment when applying the powder in infested rooms. In this context, children and pets are not allowed to be in the infested room while powder is being applied. Furthermore, it is unacceptable to apply DE-powder in bedrooms close to beds. However, if a room is infested, beds are very likely to harbour bed bugs. Moreover, the use of, for instance, vacuum cleaner in order to clean the floor sections adjacent to those where the powder is applied is significantly limited during treatment. In this context, a sanitation treatment of the above type lasts for approximately 5 weeks. Moreover, a desiccant such as DE-powder, when put in direct contact with the ambient air, rapidly absorbs humidity from the ambient air. The increased water content in the DE-powder, in turn, reduces its efficiency. In addition, as described above, bed bugs are attracted by tight and dark spaces. These favourable conditions are virtually impossible to achieve if DE-powder is freely laid on the floor. Also, removal and/or reorientation of the laid DE-powder become relatively complicated. Finally, if DE-powder is placed behind skirting-boards, the disinfestation process is prohibitively expensive, extremely time-consuming and complicated.

U.S. Pat. No. 7,676,985 discloses a rather complex system, preferably in wood or plastic, for monitoring and eradication of bed bugs and other similar pests. The system comprises an insecticide only partially enclosed by different parts of said system. This design feature severely limits its efficiency. More specifically, the insecticide at the interior of the device is accessible to bed bugs if said device is positioned on a vertical planar surface. Even then, a risk exists of bed bugs just traversing the system, i.e. entering and exiting the system via entry respectively exit points created by spacers, without getting in contact with the insecticide. If the system, on the other hand, is positioned on the horizontal planar surface such as a floor, the vertical distance between the floor and the insecticide kept at the interior of the device makes it impossible for the crawling, non-winged bed bug to get in contact with the insecticide. Consequently, the bed bug exits the system without ever getting in contact with the insecticide. Thus, inherent properties of the system make it non-suitable for horizontal positioning, i.e. positioning on the floor with the insecticide facing the floor. Thus, its use is, albeit with limited efficiency as shown above, basically limited to vertical positioning, i.e. attached to the wall and extending in the plane that is parallel with the plane of walls. This severely limits the versatility of the device, and consequently its usefulness. In the same context, system is not independent and must rely on interaction with other bodies/surfaces to operate properly.

One objective of the present invention is therefore to provide an improved system targeting insects such as bed bugs that eliminates at least some of the drawbacks associated with the current art.

SUMMARY

The above stated objective is achieved by means of an inventive concept comprising a device for detection, i.e. establishing if there are dead insects in the room through ocular inspection so as to determine whether a room is infested, and elimination of insects such as bed bugs and a roll comprising elements for assembling said device according to the independent claims, and by the embodiments according to the dependent claims. In this way a fast, safe, efficient and easily deployable solution for detection and elimination of insects such as bed bugs is obtained.

A first aspect of the present invention provides a device for detection and elimination of insects such as bed bugs. Said device comprises a structure having a main portion with a thereto associated edge, said main portion being adapted to at least partially engage with a supporting surface, the structure further comprising a first flap attached to said main portion, a first flap edge being associated to said first flap, wherein said first flap is arranged so that said edges define an opening for allowing entry of an insect such as bed bug into interior of the structure, said interior being substantially delimited by the main portion and the first flap, and wherein at least one aperture is arranged in the main portion of the structure, said device further comprising a double-sided adhesive strip an upper face of which is arranged on a face of the main portion that faces the supporting surface such that said adhesive strip completely covers the face of said at least one aperture, and an insecticide in powder form that at least partially fills the at least one aperture arranged in the main portion.

A second aspect of the present invention provides a roll with elements for assembling said device for detection and elimination of insects such as bed bugs. A continuous band of fibrous material is wound up on said roll, said band having a main portion and a first flap, wherein at least one aperture is arranged in the main portion along at least part of the length of the continuous band, and a continuous, double-sided adhesive strip is arranged on a face of the main portion along at least a part of the length of said band, said face facing away from the flap such that said adhesive strip completely covers the face of said at least one aperture, wherein said aperture is at least partially filled with an insecticide in powder form.

The device of the present invention offers unrestricted freedom as regards its positioning. Accordingly, it can be placed on the floor, in immediate vicinity of the bed, along the skirting-board or, in a vertical position, on the wall. Also, the device may easily be displaced and reoriented.

Moreover, structural design of the device prevents any significant release of dust originating from insecticide in powder form into the ambient air, whereby significant pollution of the ambient air is avoided. This contributes in improving the work environment for the sanitation personnel. The inherent structural properties of the device ensure that no significant amount of humidity from the ambient air may be absorbed by the insecticide, whereby the efficiency of the device is improved and its useful life prolonged.

Further advantages and features of embodiments will become apparent when reading the following detailed description in conjunction with the drawings.

BRIEF DESCRIPTION OF THE DRAWINGS

FIGS. 2a and FIG. 2b are highly schematical, cross-sectional respectively top view of a device according to an embodiment of the present invention, whereas FIG. 2c is a perspective view of said device.

FIG. 4a and FIG. 4b are highly schematical, cross-sectional respectively top view of a device according to another embodiment of the present invention, whereas FIG. 4c is a perspective view of said device.

FIG. 7a shows a continuous, flat band of fibrous material transformable into device according to FIGS. 4a-4c, whereas

DETAILED DESCRIPTION

The present invention will now be described more fully hereinafter with reference to the accompanying drawings, in which preferred embodiments are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Figure 1:
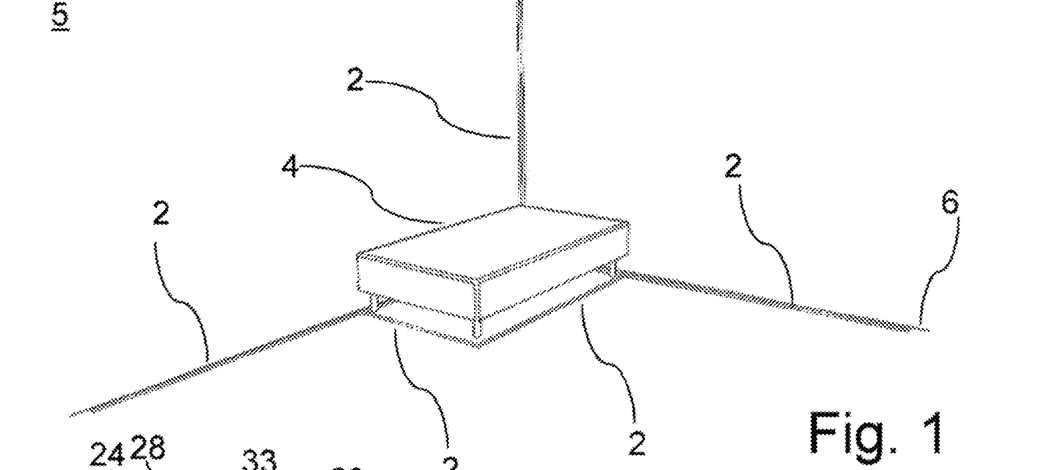
FIG. 1 is a perspective view of a bedroom with a plurality of devices according to the present invention installed in the bedroom.

FIG. 1 is a perspective view of a bedroom 5 with a plurality of devices 2 according to the present invention installed in the bedroom 5. In this context, the devices of the present invention may be used for mere detection of bed bugs, i.e. as a monitoring tool, or they may be employed as instruments for their downright elimination. As it can be seen, a device 2 may be horizontally positioned along the skirting-boards 6, or vertically positioned. It can also, in an upside-down position be attached to the face of the base of a bed 4 that faces the floor. In addition, the devices 2 may also be positioned adjacent to the bed 4. Clearly, the device offers unrestricted freedom as regards its positioning. Since beds are places in a potentially infested home that most likely will attract bed bugs, the installation of the device(s) adjacent to the bed has, in addition to its positive effects as regards detection and/or elimination of bed bugs, a positive effect on the quality of sleep of the inhabitants. In other words, the person in bed may sleep peacefully knowing that possible bed bugs will be at least contaminated by an insecticide (not shown in FIG. 1) held within the device and in most cases even permanently held within the device. Also adding to the device's versatility, the device may easily be displaced and reoriented. As an option, for increased efficiency in attracting bed bugs, the device and its components may be impregnated by an odour attractant such as a suitable pheromone.

Figures 2A, 2B, 2C:
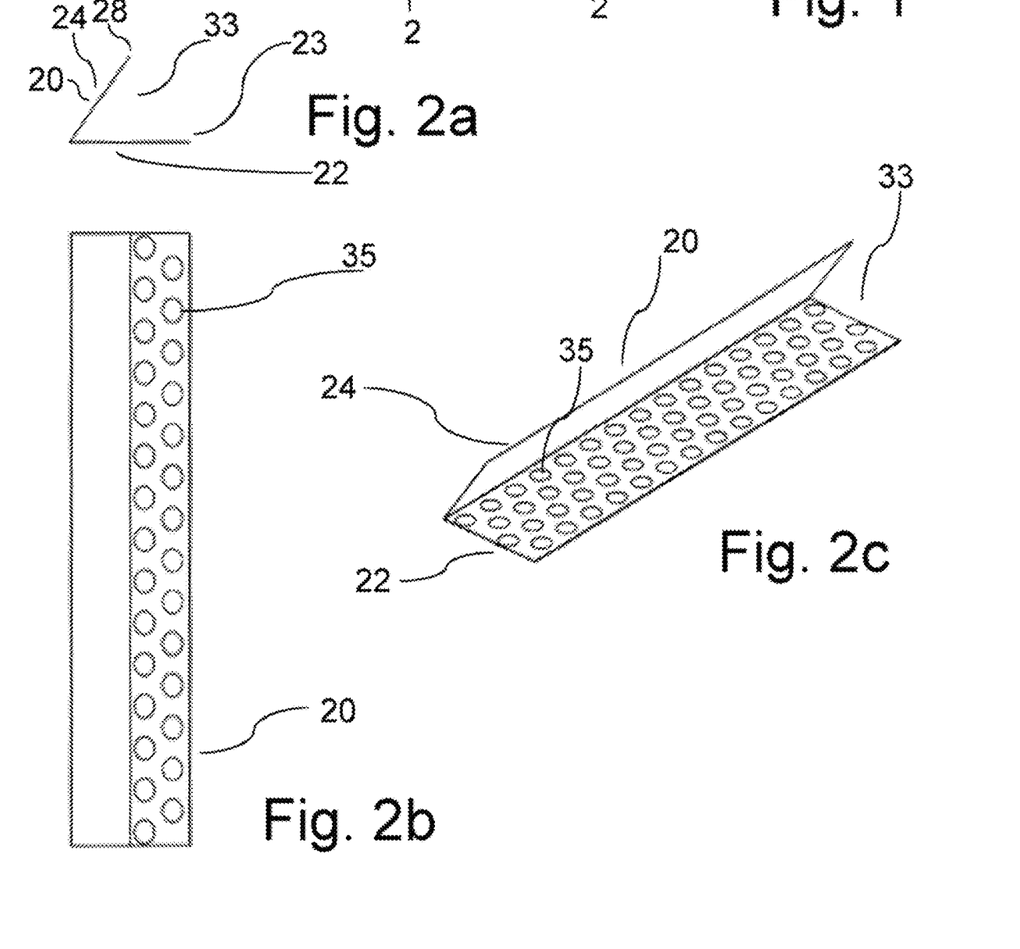

A highly schematical cross-sectional, respectively, top view of a device 2 according to an embodiment of the present invention is shown in FIGS. 2a and 2b. The device 2 comprises a structure 20 having a main portion 22 with a thereto associated edge 23, said main portion being adapted to at least partially engage with a supporting surface. The structure 20 also comprises a first flap 24 that is attached to the main portion, wherein a first flap edge 28 is associated to the first flap. Said first flap 24 is arranged so that the edges 23, 28 define an opening 33 for allowing entry of an insect such as bed bug into interior of the structure 20, said interior being substantially delimited by the main portion 22 and the first flap 24.

A plurality of apertures 35 arranged in the main portion 22 of the structure 20 is clearly visible in FIG. 2c. In addition to them, the device comprises a double-sided adhesive strip (not visible in FIG. 2c) an upper face of which is arranged on a face of the main portion 20 that faces the supporting surface. Said adhesive strip completely covers the face of the plurality of apertures 35 of FIG. 2c. An insecticide in powder form (not shown in FIGS. 2a-2c) at least partially fills the apertures 35 arranged in the main portion 22.

Figure 3A:
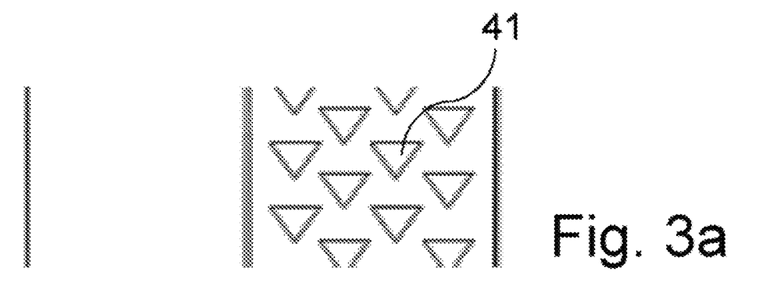
FIGS. 3a-3c show different embodiments of a main portion of a structure belonging to a device being structurally comparable to device of FIGS. 2a-2c.
Figure 3B:
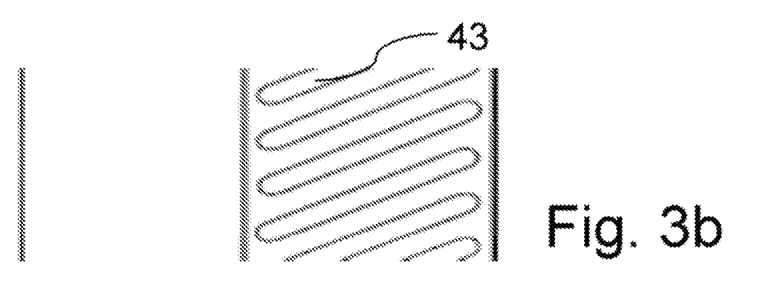
Figure 3C:
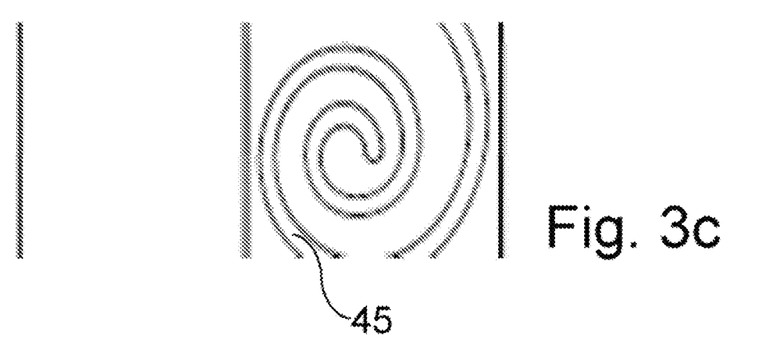

FIGS. 3a-3c show different embodiments of a main portion of a structure belonging to a device being structurally comparable to device of FIGS. 2a-2c. As it can be seen, very diverse patterns 41, 43, 45 are possible. The only functional requirement imposed being that the aperture(s) is/are so positioned that the bed bug cannot cross the main portion in a straight line without getting in contact with the mechanical insecticide that at least partially fills said apertures.

Figures 4A, 4B, 4C:
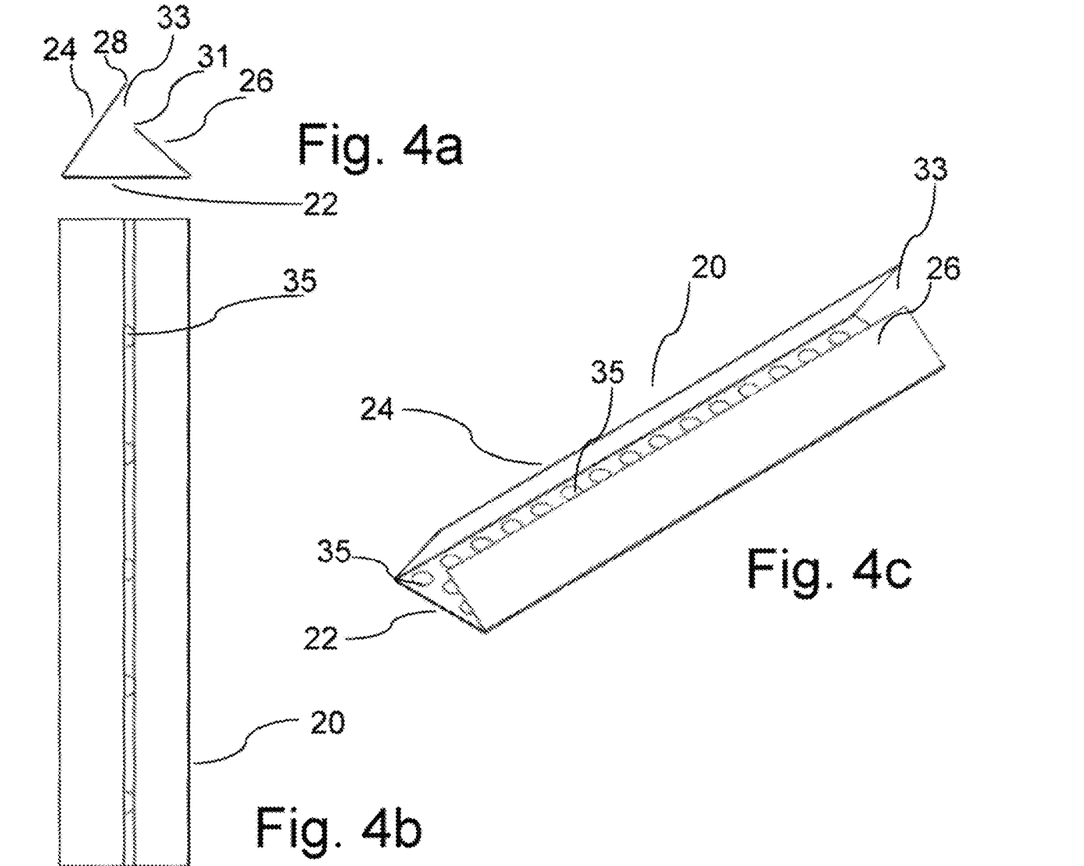

A highly schematical cross-sectional, respectively, top view of a device 2 according to another embodiment of the present invention is shown in FIGS. 4a and 4b. In this context, a structure 20 making up the device 2 is shown having a substantially triangular cross-section, but other alternatives such as rectangular, round, semi-round or oval cross-section are equally conceivable. A flat main portion 22 of the structure 20 is adapted to at least partially engage with a supporting surface, such as floor or wall. Width of the main portion 22 could be anywhere between 15 and 40 mm. First and second flaps 24, 26 are attached to the main portion 22. By providing acute angles at the joints of the main portion 22 with the respective flap 24, 26, the region at the interior of the structure 20 that is close to said joints is made attractive to bed bugs, as these prefer tight places. In the same context, inner faces of the structure 20 are preferably dark-coloured, e.g. black, as bed bugs favour dark places. Consequently, they spend more time in the structure in general, and in said region in particular, which prolongs their exposure to the insecticide (not shown in FIGS. 4a-4c). Obviously, this improves efficiency of the device. First and second edges 28, 31, substantially parallel to the main portion 22, are associated to the corresponding flaps 24, 26. Straight distance between the first and the second edge could be anywhere between 0.5 and 15 mm. An opening 33 for allowing entry of an insect such as bed bug into interior of the structure 20 is defined by said first and second edges 28, 31. In this non-limiting embodiment, the opening 33 is substantially rectangular and substantially perpendicular to the main portion 22 and the straight distance between the first and the second edge is so set to allow entry of an insect such as bed bug into an interior of the structure 20, the interior being substantially delimited by the main portion 22 and the flaps 24, 26. At least one aperture (not visible in FIG. 4a) is arranged in the main portion 22 of the structure 20.

In a non-limiting embodiment, the entire structure is made in one piece and sections of the structure where the main portion and the respective flap adjoin are notched so as to facilitate folding of the flaps.

In another non-limiting embodiment dictated by production considerations, the structure is made in paper. A further argument in favour of using paper is that bed bugs are attracted to paper objects. More specifically, as is known in the art, the paper surface has a tactile appeal to the bed bugs. In this context, other fibrous materials such as regular or corrugated cardboard, wood, textile or any combination thereof are also envisageable.

As it can be seen in FIG. 4c, FIG. 4c being a perspective view of the device of FIGS. 4a and 4b, design of the device, and in particular design of the structure 20, prevents any significant release of dust originating from insecticide in powder form (not shown in FIGS. 4a-4c) into the ambient air, whereby significant pollution of the ambient air is avoided. This also contributes in improving the work environment for the sanitation personnel. The inherent structural properties of the structure 20 ensure that no significant amount of humidity from the ambient air is absorbed by the insecticide, whereby the efficiency of the device is improved and its useful life prolonged.

A plurality of apertures 35 arranged in the main portion 22 of the structure 20 is clearly visible in FIG. 4c. In addition to them, the device comprises a double-sided adhesive strip (not visible in FIG. 4c) an upper face of which is arranged on a face of the main portion 20 that faces the supporting surface. Said adhesive strip completely covers the face of the plurality of apertures 35 of FIG. 4c.

An installed device, either on the floor, on the wall or elsewhere, creates a physical obstacle that bed bugs have to force when moving around. Once they enter the device, via the opening, they keep moving until they reach the apertures provided with the insecticide in powder form. Said insecticide is typically a mild mechanical insecticide such as diatomaceous earth (DE), also known as diatomite, infusorial earth, siliceous earth, celite or kieselgur. Optionally, the mechanical insecticide may be complemented by a suitable chemical insecticide such as boric acid. The substantially needle-shaped, micrometer-sized pieces of DE-powder penetrate the exoskeleton of the bed bug. This starts an irreversible dehydrating process in the bed bug leading eventually, i.e. after approximately 10-14 days, to its death. Usually, they remain in the interior of the device, but may occasionally manage to exit the device before they fatally dry out. Obviously, use of other insecticides than DE having suitable properties is possible. Moreover, the device according to the present invention may be used in combatting other insects having similar properties and behavioural patterns to those of bed bugs.

Figure 5A:
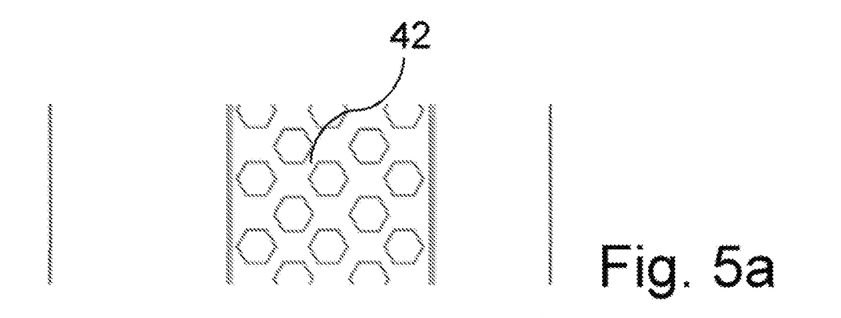
FIGS. 5a-5c show different embodiments of a main portion of a structure belonging to a device being structurally comparable to device of FIGS. 4a-4c.
Figure 5B:
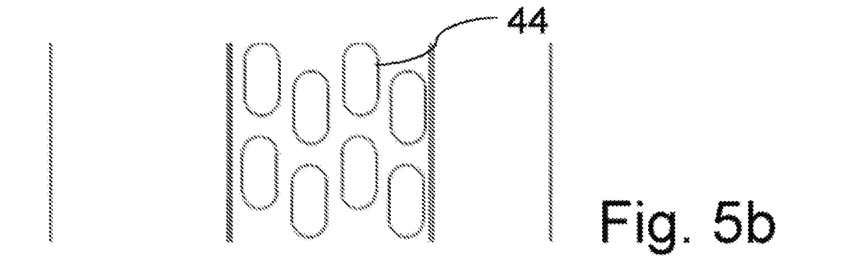
Figure 5C:
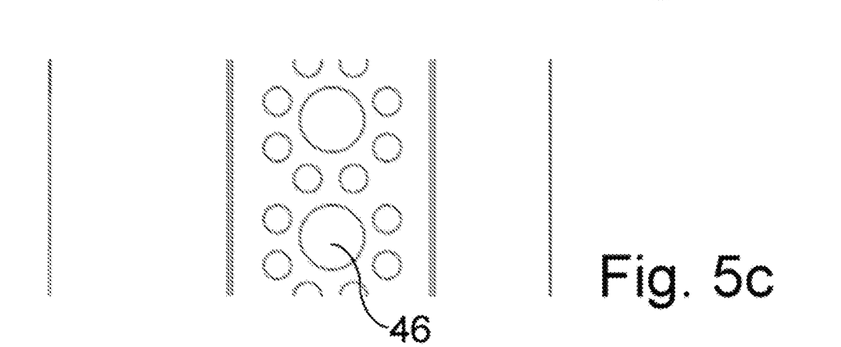

FIGS. 5a-5c show different embodiments of a main portion of a structure belonging to a device being structurally comparable to device of FIGS. 4a-4c. Once more, diverse patterns 42, 44, 46 are possible and the only functional requirement imposed is that the apertures are so positioned that the bed bug cannot cross the main portion in a straight line without getting in contact with the mechanical insecticide that at least partially fills said apertures.

Figure 6:
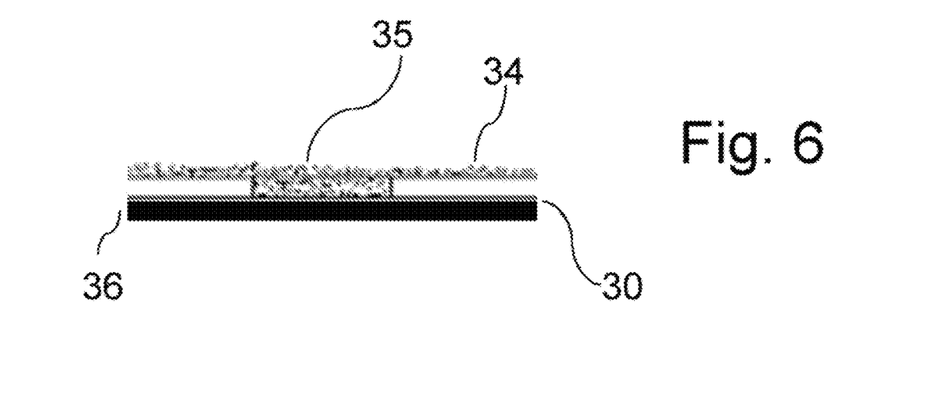
FIG. 6 is a cross-sectional close-up of a portion of a device according to one embodiment of the present invention, said close-up showing an aperture filled with insecticide in powder form.

A double-sided adhesive strip 36 may be seen in FIG. 6 which is a cross-sectional close-up of a portion of a device according to one embodiment of the present invention. FIG. 6 shows one aperture 35 arranged in a main portion of the structure, said aperture 35 being completely filled with insecticide 34 in powder form. In FIG. 6, the insecticide 34 is also provided on the face of the main portion facing away from the floor. As an alternative, to facilitate the application of the insecticide 34, a slurry containing said insecticide may be used. Consequently, prior to the installation of the device, a drying of the slurry is required so that it is transformed into powder.

First purpose of the double-sided adhesive strip 36 is to firmly anchor the entire device to the supporting surface, floor or wall. Its second purpose is to ensure that the insecticide 34 in powder form at all times at least partially fills the aperture 35 arranged in the main portion. More specifically, since the appropriate section of the adhesive strip completely covers the aperture from below, a certain quantity of the insecticide placed into the aperture is always adhesively held in the aperture. This contributes to the reliability of the device. Consequently, the device of the present invention may be placed in a vertical position on the wall and still be operative which improves its versatility. Moreover, the powder is kept in place in case of an inadvertent removal of the device, for instance if accidentally kicked. Accordingly, a robust device is obtained. Also, thanks to the interaction between the aperture and the adhesive strip, a minimum quantity of the insecticide necessary for operation of the device, i.e. necessary to at least cover the bottom face of each aperture, may be accurately determined. This renders possible significant material savings, with considerable economic as well as environmental benefits.

Figure 7A:
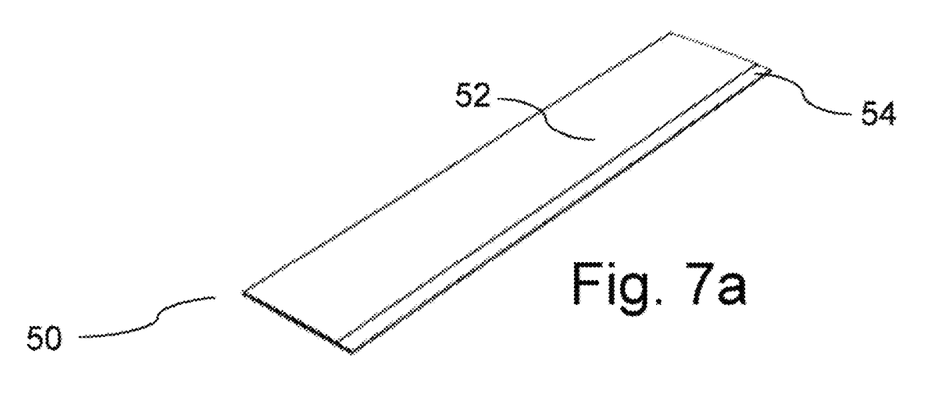
Figure 7B:
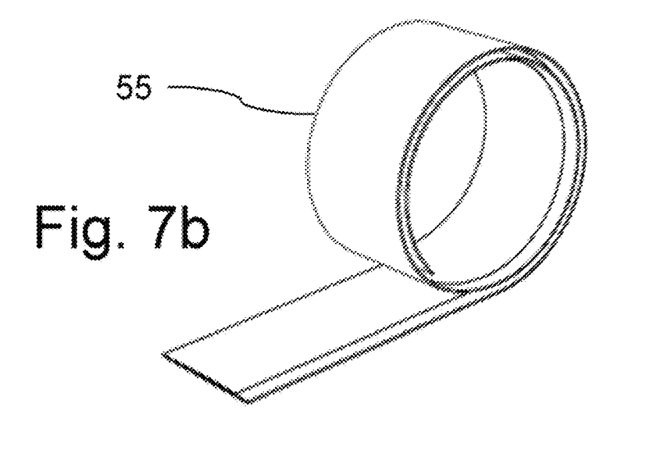
FIG. 7b shows said band when wound up in a roll.

FIG. 7a shows a continuous, flat band 50 of fibrous material transformable into device according to FIGS. 4a-4c. Said band has a main portion (not visible in FIG. 7a), a first 52 and a second flap 54, wherein the two flaps at least partially overlap. The second flap 54 is sandwiched between the first flap 52 and the main portion. An aperture (not visible in FIG. 7a) is arranged in the main portion along at least part of the length of the continuous band. A continuous, double-sided adhesive strip (not shown in FIG. 7a) is arranged on a face of the main portion along at least a part of the length of the band, said face facing away from the flaps such that said adhesive strip completely covers the face of said one aperture. Said aperture is at least partially filled with an insecticide in powder form (not shown in FIG. 7a). Driven by production considerations, long bands of fibrous material (25-30 meters), and equally long, thereto attached adhesive strips, such as band and strip of FIG. 7a, may be produced, wound up in a roll, such as a highly schematical roll 55 of FIG. 7b that is basically ready for delivery to the customer's, and subsequently cut to the right length when being installed in the room about to be treated. When said band, wound up in the roll, is to be deployed, i.e. basically transformed into the device of the present invention, it is at first unwound and appropriately positioned in the room. The band is thereafter opened, either manually by placing a finger in the opening and drawing the finger subsequently along the entire length of the band, or by a dedicated tool, forcing thereby the paper flaps to open. In order to obtain the preferred shape of the device, and in particular the preferred shape of the substantially rectangular opening, a manual adjustment of the device is probably necessary. A used up device is closed by running a hand or a dedicated tool along the outermost flap while simultaneously pressing it downwards towards the supporting surface and basically back into its shape prior to deployment. The used up device is subsequently removed and disposed of. The band is also an excellent vehicle for spreading useful information about bed bugs. For instance, a producer may make use of the band for printing operating instructions.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A roll for assembling a device for detection and elimination of insects such as bed bugs, comprising:
   a wound up, continuous flat band of fibrous material, said band having a main portion and a flap folded in a closed position so as to lie flat thereover,
   a plurality of through-going apertures arranged in the main portion along at least part of a length of the continuous band with the flap folded in the closed position so as to lie flat thereover, and
   a continuous, double-sided adhesive strip arranged on a face of the main portion along at least a part of the length of said continuous band, said face facing away from the flap and each aperture of said plurality of through-going apertures extending from said face to an opposite face facing towards the flap, such that said adhesive completely covers over each aperture of said plurality of through-going apertures, each aperture of said plurality of through-going apertures being at least partially filled with an insecticide in powder form, wherein the double-sided adhesive strip adhesively holds the insecticide in powder form in the plurality of apertures.

2. The roll according to claim 1, further comprising: an other flap, wherein the flap and the other flap at least partially overlap each other and the other flap is sandwiched between the main body portion and the flap folded in the closed position.

* * * * *